(12) United States Patent
Tian

(10) Patent No.: US 11,309,747 B2
(45) Date of Patent: Apr. 19, 2022

(54) CHARGING METHOD, CAMERA, AND ELECTRONIC TERMINAL

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/104,768

(22) Filed: Nov. 25, 2020

(65) Prior Publication Data

US 2021/0099023 A1 Apr. 1, 2021

Related U.S. Application Data

(63) Continuation of application No. PCT/CN2019/088646, filed on May 27, 2019.

(30) Foreign Application Priority Data

Jul. 16, 2018 (CN) .......................... 201810778315.7

(51) Int. Cl.
*H02J 50/80* (2016.01)
*H04M 1/02* (2006.01)
*H04M 1/72412* (2021.01)

(52) U.S. Cl.
CPC .......... *H02J 50/80* (2016.02); *H04M 1/0262* (2013.01); *H04M 1/0264* (2013.01); *H04M 1/72412* (2021.01)

(58) Field of Classification Search
CPC ............... H02J 50/80; H04M 1/72412; H04M 1/0262; H04M 1/0264
See application file for complete search history.

(56) References Cited

U.S. PATENT DOCUMENTS

2016/0044728 A1  2/2016  Hong et al.

FOREIGN PATENT DOCUMENTS

| CN | 103686080 A | 3/2014 |
| CN | 104410781 A | 3/2015 |
| CN | 205319803 U | 6/2016 |
| CN | 205610773 U | 9/2016 |

(Continued)

OTHER PUBLICATIONS

International Search Report with English Translation for International Application No. PCT/CN2019/088646, dated Aug. 28, 2019 (13 pages).

(Continued)

*Primary Examiner* — Robert L Deberadinis
(74) *Attorney, Agent, or Firm* — Young Basile Hanlon & MacFarlane, P.C.

(57) ABSTRACT

A charging method, a camera, and a computer storage medium are provided. The method is applied to a camera configured with a first wireless power supply module. The charging method includes: receiving a starting instruction, and in response to the starting instruction, performing rise processing; when rising to a preset position, establishing wireless connection with a preset terminal, wherein the preset terminal is configured with a second wireless power supply module; and performing charging processing with the preset terminal by means of the first wireless power supply module and the second wireless power supply module.

20 Claims, 6 Drawing Sheets

(56) References Cited

FOREIGN PATENT DOCUMENTS

| | | |
|---|---|---|
| CN | 106034167 A | 10/2016 |
| CN | 106331224 A | 1/2017 |
| CN | 107197133 A | 9/2017 |
| CN | 107546873 A | 1/2018 |
| CN | 207166546 U | 3/2018 |
| CN | 108156309 A | 6/2018 |

OTHER PUBLICATIONS

Chinese First Office Action with English Translation of Chinese Application No. 201810778315.7 dated Oct. 9, 2020 (13 pages).

CHARGING METHOD, CAMERA, AND ELECTRONIC TERMINAL

CROSS-REFERENCE TO RELATED APPLICATIONS

This application is a continuation-application of International (PCT) Patent Application No. PCT/CN2019/088646 filed on May 27, 2019, which claims the foreign priority to the Chinese Patent Application No. 201810778315.7 filed on Jul. 16, 2018, the entire contents of both of which are hereby incorporated by reference in their entireties.

TECHNICAL FIELD

The present disclosure relates to charging technologies in the field of electric products, and in particular to a charging method, a camera, and an electronic terminal.

BACKGROUND

A conventional terminal may define a camera hole in a rear cover of a battery, resulting in overall airtightness of the terminal being reduced. Further, a shell of a slide terminal may slide for a relatively long distance to expose a rear camera, such that power consumption of the slide terminal may be relatively high. Therefore, in the related art, a terminal configured with an elevated camera is provided, and a sliding distance for which the camera is extended is reduced effectively, such that the airtightness of the terminal is achieved, and at the same time, the power consumption of the terminal is reduced.

In the related art, the elevated camera may be connected to the terminal through a flexible printed circuit (FPC) board, and power is supplied for the camera by the FPC board. However, in order to allow the terminal to supply power to the elevated camera normally, an impedance of the FPC board needs to be controlled, and a size of the FPC board is to be limited. In this way, feasibility of producing the elevated camera may be reduced. From another perspective, the FPC board may be rolled repetitively while turning on and turning off the elevated camera repetitively, such that service time of the FPC board may be reduced, and quality of the camera may be reduced. Therefore, in the related art, the feasibility of producing the elevated camera and the quality of the elevated camera is significantly affected by charging the elevated camera through the FPC board.

SUMMARY OF THE DISCLOSURE

According to a first aspect of the present disclosure, a charging method is provided and is applied in a camera configured with a first wireless power supply module. The method comprises: receiving a turn-on instruction, performing a lifting operation in response to the turn-on instruction; establishing wireless connection between the camera and a predefined terminal, wherein the predefined terminal is configured with a second wireless power supply module; and performing a charging process through the first wireless power supply module and the second wireless power supply module.

According to a second aspect of the present disclosure, an electronic terminal is provided and includes a terminal body and a camera. The camera includes: a shell slidably connected to the terminal body, a camera module, and a first power supply module. The camera module and the first power supply module are arranged inside the shell, and are configured to be synchronously slided relative to the terminal body when the shell is slided relative to the terminal body. The terminal body is arranged with a second power supply module. The first power supply module is configured to wirelessly connect to the second power supply module in response to the first power supply module being slided to reach a predefined position relative to the second power supply module. The camera is configured to receive a charging process through the first power supply module and the second power supply module.

According to a third aspect of the present disclosure, a camera is provided and includes a processor, a non-transitory memory which stores an instruction able to be executed by the processor, a communication interface, and a bus line configured to connect to the processor, the non-transitory memory, and the communication interface. The processor is configured to execute the instruction to perform operations of: receiving, by the camera, a turn-on instruction, performing a lifting operation on the camera in response to the turn-on instruction; establishing wireless connection between the camera and a predefined terminal, wherein the predefined terminal is configured with a second wireless power supply module; and performing a charging process on the camera through the first wireless power supply module and the second wireless power supply module.

DETAILED DESCRIPTION

Figure 1:
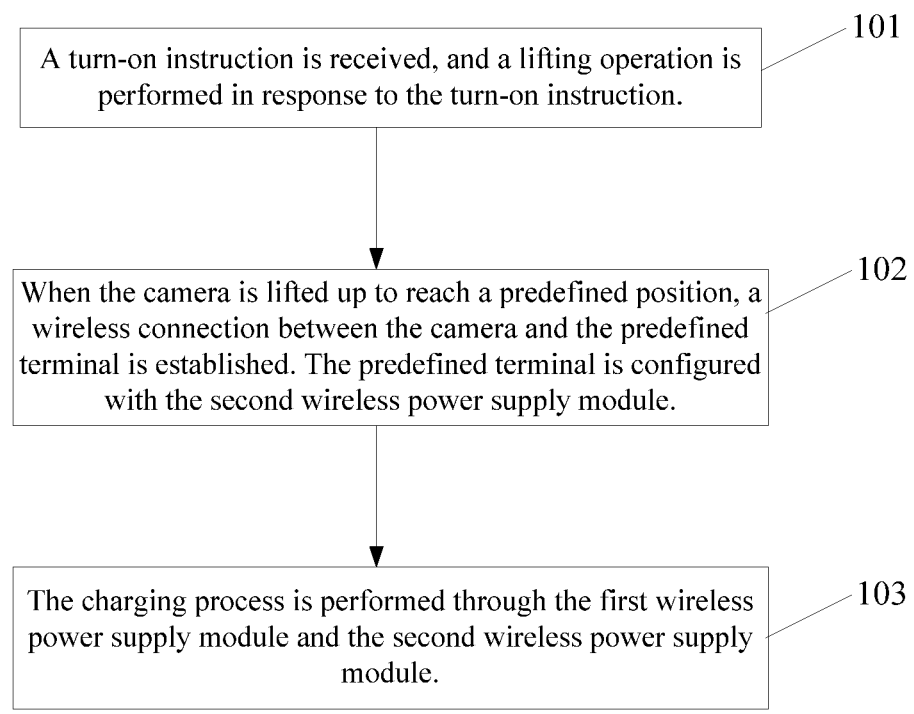
FIG. 1 is a flow chart I showing a charging method according to an embodiment of the present disclosure.

The technical solutions in the embodiments of the present disclosure are clearly and comprehensively described in the following with reference to the accompanying drawings in the embodiments of the present disclosure. It should be understood that the described embodiments are for the purpose of explaining the present disclosure but not to limit the present disclosure. Further, in order to provide a concise description, only the components related to the present disclosure are shown in the drawings.

In the embodiments of the present disclosure, a charging method may be applied on an elevated camera configured in a terminal. The elevated camera is arranged with a first wireless power supply module. The predefined terminal is arranged with a second wireless power supply module. The technical solutions in the embodiments of the present disclosure are clearly and comprehensively described in the following with reference to the accompanying drawings in the embodiments of the present disclosure.

According to a first aspect of the present disclosure, a charging method is provided and is applied in a camera configured with a first wireless power supply module. The method comprises: receiving a turn-on instruction, performing a lifting operation in response to the turn-on instruction; establishing wireless connection between the camera and a predefined terminal, wherein the predefined terminal is configured with a second wireless power supply module; and performing a charging process through the first wireless power supply module and the second wireless power supply module.

In some embodiments, the performing a charging process through the first wireless power supply module and the second wireless power supply module, includes: sending a charging request to the predefined terminal through the first wireless power supply module; receiving a charging response which is sent from the predefined terminal through the second wireless power supply module; and performing the charging process based on the charging response.

In some embodiments, the performing a charging process through the first wireless power supply module and the second wireless power supply module, includes: receiving a power supply request which is sent from the predefined terminal through the second wireless power supply module; and sending a power supply response to the predefined terminal through the first wireless power supply module, and performing the charging process based on the power supply response.

In some embodiments, after the receiving a turn-on instruction, the charging method further includes: activating the first wireless power supply module in response to the turn-on instruction.

In some embodiments, after the performing the charging process based on the charging response, the charging method further includes: sending a first disconnection request to the predefined terminal through the first wireless power supply module; receiving a first disconnection response which is sent from the predefined terminal through the second wireless power supply module; and interrupting the wireless connection between the camera and the predefined terminal based on the first disconnection response.

In some embodiments, after the performing the charging process based on the charging response, the charging method further includes: receiving a second disconnection request which is sent from the predefined terminal through the second wireless power supply module; and sending a second disconnection response to the predefined terminal through the first wireless power supply module, and interrupting the wireless connection between the camera and the predefined terminal based on the second disconnection response.

In some embodiments, after the performing a charging process through the first wireless power supply module and the second wireless power supply module, the charging method further includes: receiving a turn-off instruction; and performing a lowering-down operation in response to the turn-off instruction.

According to a second aspect of the present disclosure, an electronic terminal is provided and includes a terminal body and a camera. The camera includes: a shell slidably connected to the terminal body, a camera module, and a first power supply module. The camera module and the first power supply module are arranged inside the shell, and are configured to be synchronously slided relative to the terminal body when the shell is slided relative to the terminal body. The terminal body is arranged with a second power supply module. The first power supply module is configured to wirelessly connect to the second power supply module in response to the first power supply module being slided to reach a predefined position relative to the second power supply module. The camera is configured to receive a charging process through the first power supply module and the second power supply module.

In some embodiments, the predefined position is a relative position at which an area of an overlapping region between the first wireless power supply module and the second wireless power supply module is greater than a threshold and satisfies a requirement for the charging process to be performed.

In some embodiments, the terminal body further includes a middle frame; the middle frame includes: two side faces opposite to each other, a top face arranged between and connected to the two side faces, and a bottom face arranged between and connected to the two side faces; and the top face is recessed inwardly towards the bottom face to define a receiving chamber.

In some embodiments, the shell is slidably connected to the middle frame of the terminal body.

In some embodiments, the shell is capable of being slided to be received in the receiving chamber of the terminal body, enabling the first power supply module and the second power supply module to be disconnected from each other.

In some embodiments, the shell is capable of being slided to be extended out of the receiving chamber of the terminal body, enabling the first power supply module to be slided to reach the predefined position relative to the second power supply module.

According to a third aspect of the present disclosure, a camera is provided and includes a processor, a non-transitory memory which stores an instruction able to be executed by the processor, a communication interface, and a bus line configured to connect to the processor, the non-transitory memory, and the communication interface. The processor is configured to execute the instruction to perform operations of: receiving, by the camera, a turn-on instruction, performing a lifting operation on the camera in response to the turn-on instruction; establishing wireless connection between the camera and a predefined terminal, wherein the predefined terminal is configured with a second wireless power supply module; and performing a charging process on the camera through the first wireless power supply module and the second wireless power supply module.

In some embodiments, when performing a charging process on the camera through the first wireless power supply module and the second wireless power supply module, the processor is further configured to execute the instruction to perform operations of: sending a charging request to the predefined terminal through the first wireless power supply module from the camera; receiving, by the camera, a charging response which is sent from the predefined terminal through the second wireless power supply module; and performing the charging process on the camera based on the charging response.

In some embodiments, when performing a charging process on the camera through the first wireless power supply module and the second wireless power supply module, the processor is further configured to execute the instruction to perform operations of: receiving, by the camera, a power supply request which is sent from the predefined terminal through the second wireless power supply module; and sending a power supply response to the predefined terminal through the first wireless power supply module from the camera, and performing the charging process on the camera based on the power supply response.

In some embodiments, after the receiving, by the camera, a turn-on instruction, the processor is further configured to execute the instruction to perform operations of: activating the first wireless power supply module in response to the turn-on instruction.

In some embodiments, after the performing the charging process on the camera based on the charging response, the processor is further configured to execute the instruction to perform operations of: sending a first disconnection request to the predefined terminal through the first wireless power supply module from the camera; receiving, by the camera, a first disconnection response which is sent from the predefined terminal through the second wireless power supply module; and interrupting the wireless connection between the camera and the predefined terminal based on the first disconnection response.

In some embodiments, after the performing the charging process on the camera based on the charging response, the processor is further configured to execute the instruction to perform operations of: receiving, by the camera, a second disconnection request which is sent from the predefined terminal through the second wireless power supply module; and sending a second disconnection response to the predefined terminal through the first wireless power supply module from the camera, and interrupting the wireless connection between the camera and the predefined terminal based on the second disconnection response.

In some embodiments, after the performing a charging process through the first wireless power supply module and the second wireless power supply module, the processor is further configured to execute the instruction to perform operations of: receiving a turn-off instruction; and performing a lowering-down operation in response to the turn-off instruction.

Embodiment I

In the present embodiment, a charging method is provided. FIG. 1 shows a flow chart I showing a charging method according to an embodiment of the present disclosure. As shown in FIG. 1, in the present embodiment of the disclosure, the method for charging the camera includes following operations.

In an operation 101, a turn-on instruction is received by the camera, and a lifting operation is performed on the camera in response to the turn-on instruction.

In the present embodiment, the camera may receive the turn-on instruction first, and the lifting operation may be performed on the camera in response to the turn-on instruction. The camera may be arranged with the first wireless power supply module.

It should be noted that, in the present embodiment, the camera may receive the turn-on instruction by various means. For example, the camera may receive the turn-on instruction based on a pressing operation performed by a user, or based on a pre-set triggering condition.

It should be noted that, in the present embodiment, the camera may be an image shooting element arranged in the predefined terminal. Further, in the present embodiment, the camera may be slidably connected to the predefined terminal. That is to say the camera may be lifted up and lowered down relative to the predefined terminal.

Further, in the present embodiment, the camera may be lifted up after being turned on. Correspondingly, the camera may be lowered down after being turned off.

Figure 2:
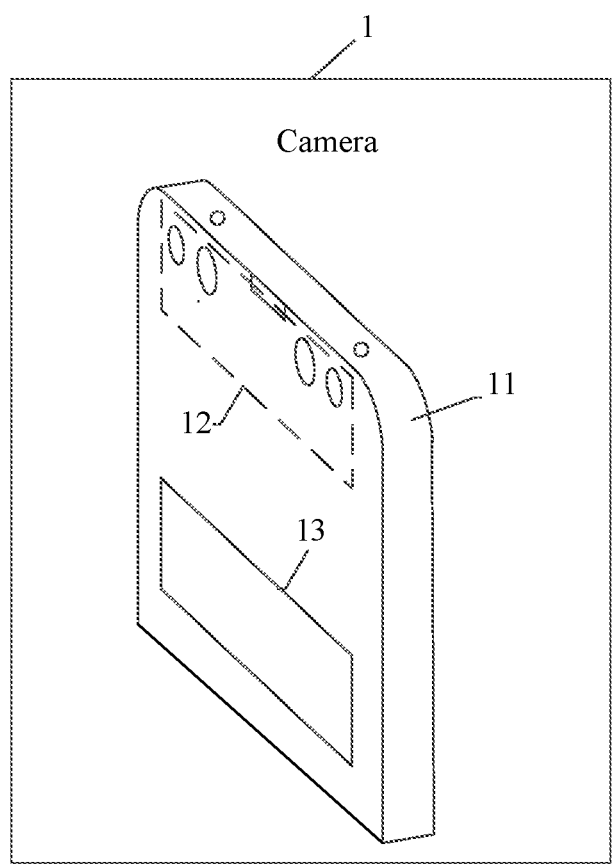
FIG. 2 is a first structural view of a camera according to an embodiment of the present disclosure.

FIG. 2 is a first structural view of a camera according to an embodiment of the present disclosure. As shown in FIG. 2, in the present embodiment, the camera 1 substantially includes a shell 11, a camera module 12, and a first wireless power supply module 13. The camera module 12 and the first wireless power supply module 13 are arranged inside the shell 11. The shell 11 may be lifted up or lowered down relative to the predefined terminal, and the camera module 12 and the first wireless power supply module 13 may be synchronously lifted up and lowered down relative to the predefined terminal along with the shell 11.

In an operation 102, when the camera is lifted up to reach a predefined position, wireless connection between the camera and the predefined terminal is established. The predefined terminal is configured with the second wireless power supply module.

In the present embodiment, after the camera receives the turn-on instruction, the camera is lifted up in response to the turn-on instruction, and the wireless connection between the camera and the predefined terminal may be established in response to the camera being lifted to reach the predefined position. The predefined terminal is configured with the second wireless power supply module. In details, the second wireless power supply module is configured to interact with the first wireless power supply module.

It should be noted that, in the present embodiment, the predefined terminal may be any terminal having a communication function and a storage function, such as a tablet computer, a mobile phone, an electronic reader, a remote controller, a personal computer, a laptop computer, a vehicle-mounted device, a network television, a wearable device, and so on.

Figure 3:
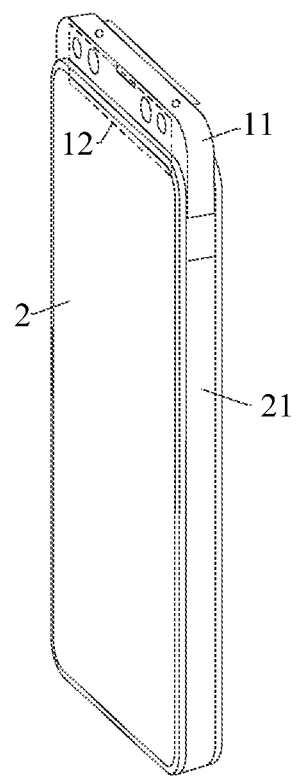
FIG. 3 is a structural view of a connection between a predefined terminal and a camera according to an embodiment of the present disclosure.

Based on FIG. 2, FIG. 3 is a structural view of a connection between the predefined terminal and the camera according to the embodiment of the present disclosure. As shown in FIG. 3, in the present embodiment, the predefined terminal 2 may include a middle frame 21, and the shell 11 may be slidably connected to the middle frame 21.

Figure 4:
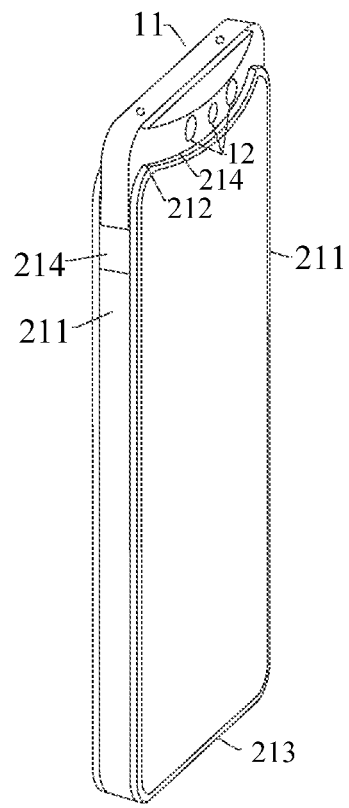
FIG. 4 is a structural schematic view of a predefined terminal according to an embodiment of the present disclosure.

Based on FIG. 2 and FIG. 3, FIG. 4 is a structural schematic view of the predefined terminal according to the embodiment of the present disclosure. As shown in FIG. 4, the middle frame 21 includes two side faces 211 opposite to each other and a top face 212 arranged between and connected to the two side faces 211. In details, the middle frame 21 further includes a bottom face 213 opposite to the top face 212, and the bottom face 213 is arranged between and connected to the two side faces 211. The middle frame 21 further defines a receiving groove 214. The top face 212 is recessed towards inwardly towards the bottom face 213 to define the receiving groove 214. The receiving groove 214 is extended through the two side faces 211. The shell 11 is received in the receiving groove 214 and is slidably connected to the middle frame 21. In other words, the shell 11 is slidably connected to the middle frame 21 to be extended out of or to be received in the receiving groove 214.

Further, in the present embodiment, the predefined position may be a particular relative position between the first wireless power supply module and the second wireless power supply module enabling the camera to be used normally. In details, in the present embodiment, in a process of lifting the camera, an overlapping region between the first wireless power supply module and the second wireless power supply module may be generated. The relative position between the first wireless power supply module and the second wireless power supply module may be determined as satisfying a requirement for charging, in response to an area of the overlapped region being greater than a preset overlapping threshold, and the camera may set the relative position at which the area of the overlapped region being greater than the preset overlapping threshold to be the predefined position.

Figure 5:
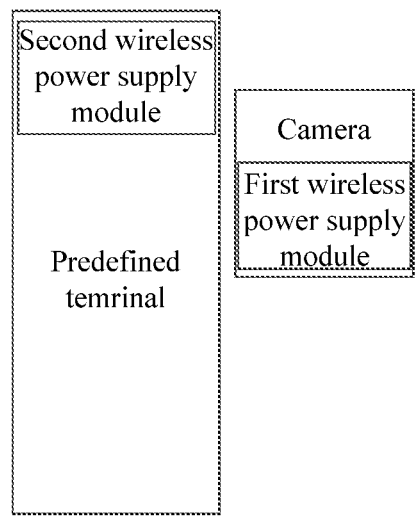
FIG. 5 is a schematic view of a first relative position according to an embodiment of the present disclosure.

FIG. 5 is a first schematic view of a relative position according to an embodiment of the present disclosure. As shown in FIG. 5, before the camera is turned on, the camera is not lifted up. At this stage, the first wireless power supply module and the second wireless power supply module may not be overlapped along the thickness direction of the predefined terminal, in this way, the first wireless power supply module and the second wireless power supply module are disconnected, and the relative position between the first wireless power supply module and the second wireless power supply module does not satisfy the requirement for the charging process to be performed.

Figure 6:
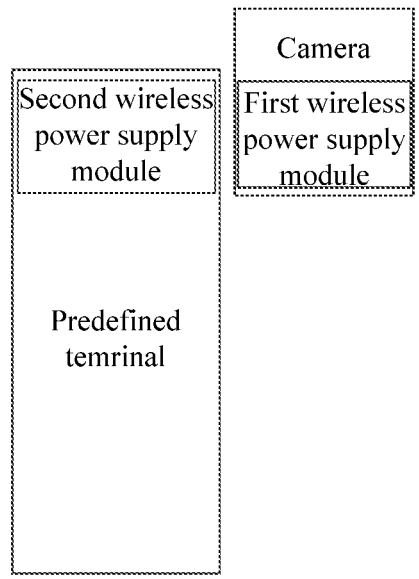
FIG. 6 is a schematic view of a second relative position according to an embodiment of the present disclosure.

FIG. 6 is a second schematic view of a relative position according to an embodiment of the present disclosure. As shown in FIG. 6, after the camera is turned on, the camera is lifted up and reaches the predefined position. At the predefined position, the first wireless power supply module and the second wireless power supply module may be overlapped along a thickness direction of the predefined terminal, and the predefined position satisfies the requirement for charging.

Further, in the present embodiment, the wireless connection between the camera and the predefined terminal may be established in response to the camera being lifted up and reaching the predefined position. In details, in the present embodiment, the wireless connection between the camera and the predefined terminal may be established via the first wireless power supply module and the second wireless power supply module.

It should be noted that, in the present embodiment, a physical connection between the first wireless power supply module and the second wireless power supply module does not exist. Therefore, a wireless charging process is performed on the camera by the predefined terminal.

In an operation 103, the charging process is performed on the camera through the first wireless power supply module and the second wireless power supply module.

In the present embodiment, after the wireless connection between the camera and the predefined terminal is established in response to the camera being lifted up and reaching the predefined position, the charging process may be performed on the camera through the first wireless power supply module and the second wireless power supply module.

It should be noted that, in the present embodiment, after the camera is lifted up and reaches the predefined position, it is determined that the relative position between the first wireless power supply module and the second wireless power supply module satisfies the requirement for charging. Therefore, the wireless connection between the camera and the predefined terminal is established, and the charging process is performed on the camera.

Further, in the present embodiment, the charging process refers to a unidirectional power supply. In details, the charging process refers to the predefined terminal supplying power to the camera.

It should be noted that, in the present embodiment, the charging process is achieved through the first wireless power supply module and the second wireless power supply module. As the physical connection between the first wireless power supply module and the second wireless power supply module does not exist, the feasibility of producing the camera is not limited. In addition, due to absence of the physical connection between the first wireless power supply module and the second wireless power supply module, lifting up and lowering down the camera repetitively may not affect the quality of the camera.

In the present embodiment, after the camera receives the turn-on instruction and before the wireless connection between the camera and the predefined terminal is established, the method for charging the camera further includes following operations.

In an operation 104, the first wireless power supply module is activated in response to the turn-on instruction.

In the present embodiment, after the camera receives the turn-on instruction and before the wireless connection between the camera and the predefined terminal is established, the first wireless power supply module of the camera may be activated in response to the turn-on instruction.

It should be noted that, in the present embodiment, the first wireless power supply module of the camera may be deactivated in response to the camera being not required to be charged; and after the turn-on instruction is received, the first wireless power supply module of the camera may be activated. In this way, the power consumption may be reduced significantly.

According to the present embodiment, a charging method is provided. When the camera receives the turn-on instruction, the lifting operation may be performed on the camera in response to the turn-on instruction. The wireless connection between the camera and the predefined terminal is established in response to the camera being lifted up and reaching the predefined position. The predefined terminal is arranged with the second wireless power supply module. The charging process may be performed on the camera by the predefined terminal through the first wireless power supply module and the second wireless power supply module. Therefore, in the present embodiment, the camera may be configured with the first wireless power supply module, and the predefined terminal may be configured with the second wireless power supply module. After the wireless connection is established through the first wireless power supply module and the second wireless power supply module, the charging process may be performed on the camera directly. As the camera is wirelessly connected to the predefined terminal, in the process of the charging process, the camera may not be limited by the impedance control, and therefore, the feasibility of producing the camera is improved. Further, in the present embodiment, as the connection between the camera and the predefined terminal is non-physical connection, the service time of the camera may not be reduced due to repetitively lifting up and lowering down the camera for turning on and turning off. Therefore, the quality of the camera may be improved effectively.

Embodiment II

Based on Embodiment I, in the present embodiment, the method for charging the camera through the first wireless power supply module and the second wireless power supply module further includes following operations.

In an operation 103a, a charging request is sent to the predefined terminal from the camera through the first wireless power supply module.

In the present embodiment, after the wireless connection between the camera and the predefined terminal is established in response to the camera being lifted up and reaching the predefined position, the camera may send the charging request to the predefined terminal through the first wireless power supply module.

It should be noted that, in the present embodiment, after the wireless connection between the camera and the predefined terminal is established, the camera may send the charging request to the terminal in response to the camera being required to be charged.

It should be noted that, in the present embodiment, the charging request may carry information about a current state and remaining power of the camera. In details, in the present embodiment, the current state may indicate a working state of the camera. For example, the current state may be an image shooting state or a video recording state.

In an operation 103b, the charging response, which is sent from the predefined terminal through the second wireless power supply module, is received by the camera.

In the present embodiment, after the camera sends the charging request to the predefined terminal through the first wireless power supply module, the camera may receive the charging response sent from the predefined terminal through the second wireless power supply module.

It should be noted that, in the present embodiment, after the camera sends the charging request to the predefined terminal, the camera may receive the charging response in response to the charging request, such that a following operation may be performed based on the charging response.

Further, in the present embodiment, the charging response may be configured to determine whether the charging process is to be performed. In details, in the present embodiment, the charging response may carry the charging instruction. In details, the charging instruction may be configured to instruct whether the charging process is to be performed.

Further, in the present embodiment, the charging instruction may be allowing the charging process or refusing the charging process. When the charging instruction carried by the charging response is allowing the charging process, the charging process may be performed on the camera.

It should be noted that, in the present embodiment, the charging response may be determined by the predefined terminal by various means. For example, the charging response may be determined by the predefined terminal based on a user's selection. Alternatively, the charging response may be determined by the predefined terminal based on a default setting.

Figure 7:
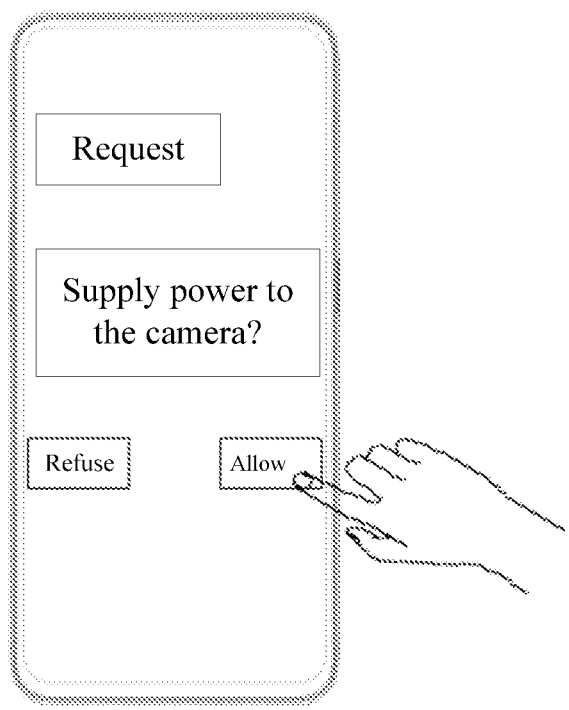
FIG. 7 is a view showing a predefined terminal receiving a charging response according to an embodiment of the present disclosure.

FIG. 7 is a view showing a predefined terminal receiving a charging response according to an embodiment of the present disclosure. As shown in FIG. 7, based on the user's selection, the predefined terminal may determine that the charging instruction carried by the charging response is allowing the charging process.

In an operation 103c, the charging process is performed on the camera based on the charging response.

In the present embodiment, the charging process may be performed on the camera, after the camera receives the charging response sent from the predefined terminal through the second wireless power supply module.

It should be noted that, in the present embodiment, the charging process may be performed on the camera after the camera receives the charging response through the first wireless power supply module, such that the predefined terminal wirelessly supplying power to the camera is achieved.

Further, in the present embodiment, the method for charging the camera through the first wireless power supply module and the second wireless power supply module further includes following operation.

In an operation 103d, a power supply request, which is sent from the predefined terminal through the second wireless power supply module, is received by the camera.

In the present embodiment, after the wireless connection between the camera and the predefined terminal is established in response to the camera being lifted up to reaching the predefined position, the camera may receive the power supply request, which is sent from the predefined terminal through the second wireless power supply module, through the first wireless power supply module.

It should be noted that, in the present embodiment, after the wireless connection between the camera and the predefined terminal is established, the camera may receive the power supply request, which is sent from the predefined terminal through the second wireless power supply module, in response to the predefined terminal being required to supply power to the camera.

It should be noted that, in the present embodiment, the power supply request may carry a current state and remaining power of the predefined terminal. In details, in the present embodiment, the current state may indicate a working state of the predefine terminal.

In an operation 103e, a power supply response is sent to the predefined terminal from the camera through the first wireless power supply module, and the charging process is performed on the camera based on the power supply response.

In the present embodiment, after the camera receives the power supply request, which is sent from the predefined terminal through the second wireless power supply module, through the first wireless power supply module, the camera may send the power supply response to the predefined terminal through the first wireless power supply module, and the charging process is performed on the camera based on the power supply response.

It should be noted that, in the present embodiment, after the camera receives the power supply request sent from the predefined terminal, the camera may send the power supply response in response to the power supply request, such that a following operation may be performed based on the power supply response.

Further, in the present embodiment, the power supply response may be configured to determine whether the charging process is to be performed. In details, in the present embodiment, the power supply response may carry the charging instruction. In details, the charging instruction is configured to instruct whether the charging process is to be performed.

Further, in the present embodiment, the charging instruction may be allowing the charging process or refusing the charging process. When the charging instruction carried by the power supply response is allowing the charging process, the charging process may be performed on the camera.

Further, in the present embodiment, the charging process may be performed on the camera after the camera sends the power supply response to the predefined terminal.

It should be noted that, in the present embodiment, the camera may send the power supply response to the predefined terminal through the first wireless power supply module, and the charging process may be performed on the camera through the first wireless power supply module, such that the predefined terminal may supply power to the camera wirelessly.

According to the present embodiment, a charging method is provided. The camera receives the turn-on instruction, and the lifting operation is performed on the camera in response to the turn-on instruction. The wireless connection between the camera and the predefined terminal is established in response to the camera being lifted up to reach the predefined position. The predefined terminal is configured with the second wireless power supply module. The charging process may be performed on the camera by the predefined terminal through the first wireless power supply module and the second wireless power supply module. Therefore, in the present embodiment, the camera may be configured with the first wireless power supply module, and the predefined terminal may be configured with the second wireless power supply module. After the wireless connection is established through the first wireless power supply module and the second wireless power supply module, the charging process may be performed on the camera directly. As the camera is wirelessly connected to the predefined terminal, while performing the charging process, the camera may not be limited by the impedance control, and therefore, the feasibility of the producing the camera may be improved. Further, in the present embodiment, as the wireless connection between the camera and the predefined terminal is non-physical connection, the service time of the camera may not be reduced due to repetitively lifting up and lowering down the camera for turning on and turning off. Therefore, the quality of the camera may be improved effectively.

Embodiment III

Based on the above Embodiment II, in the present embodiment, after the charging process is performed on the camera based on the charging response, the method for charging the camera further includes following operations.

In an operation 103*f*, a first disconnection request is sent to the predefined terminal from the camera through the first wireless power supply module.

In the present embodiment, the camera may send the first disconnection request to the predefined terminal through the first wireless power supply module after the charging process is performed on the camera based on the charging response.

It should be noted that, in the present embodiment, after the charging process is performed on the camera, the camera may send a request for disconnecting from the predefined terminal to the predefined terminal through the first wireless power supply module, and that is the camera may send the first disconnection request.

Further, in the present embodiment, the first disconnection request may carry a current connection state between the camera and the predefined terminal.

In an operation 103*g*, a first disconnection response, which is sent from the predefined terminal through the second wireless power supply module, is received by the camera.

In the present embodiment, after the camera sends the first disconnection request to the predefined terminal through the first wireless power supply module, the camera may receive the first disconnection response which is sent from the predefined terminal through the second wireless power supply module.

It should be noted that, in the present embodiment, after the camera sends the first disconnection request to the predefined terminal, the camera may receive the first disconnection response in response to the first disconnection request, such that a following operation may be performed based on the first disconnection response.

Further, in the present embodiment, the first disconnection response may carry a disconnection instruction. In details, the disconnection instruction may be configured to instruct whether the camera is to be disconnected from the predefined terminal.

Further, in the present embodiment, the disconnection instruction may be allowing disconnection or refusing disconnection. When the disconnection instruction carried by the first disconnection response is allowing disconnection, the camera may be disconnected from the predefined terminal.

It should be noted that, in the present embodiment, the first disconnection response may be determined by the predefined terminal by various means. For example, the first disconnection response may be determined by the predefined terminal based on a user's selection. Alternatively, the first disconnection response may be determined by the predefined terminal based on a default setting.

Figure 8:
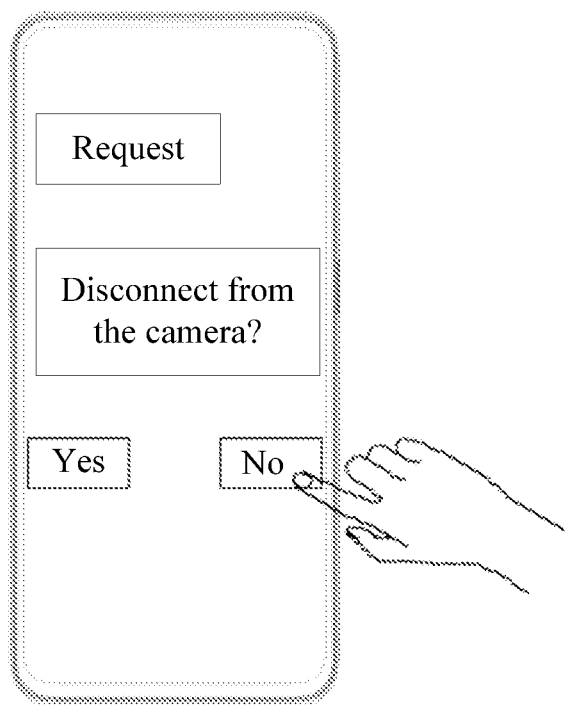
FIG. 8 is a view showing a predefined terminal receiving a first disconnection response according to an embodiment of the present disclosure.

FIG. 8 is a view showing a predefined terminal acquiring a first disconnection response according to an embodiment of the present disclosure. As shown in FIG. 8, the predefined terminal may determine that the disconnection instruction carried by the first disconnection response is refusing disconnection based on the user's selection.

In an operation 103*h*, the wireless connection with the predefined terminal is interrupted based on the first disconnection response.

In the present embodiment, the camera may be disconnected from the predefined terminal based on the first disconnection response, after the camera receives the first disconnection response sent from the predefined terminal through the second wireless power supply module.

It should be noted that, in the present embodiment, the predefined terminal may be disconnected from the predefined terminal, after the camera receives the first disconnection response through the second wireless power supply module, such that the power consumption may be reduced effectively.

Further, in the present embodiment, after the charging process is performed on the camera based on the power supply response, the method for charging the camera further includes following operations.

In an operation 103*i*, a second disconnection request, which is sent from the predefined terminal through the second wireless power supply module, is received.

In the present embodiment, the camera may receive the second disconnection request, which is sent from the predefined terminal through the second wireless power supply module, through the first wireless power supply module, after the charging process is performed on the camera based on the power supply response.

It should be noted that, in the present embodiment, after the charging process is performed on the camera by the predefined terminal, the camera may receive the second disconnection request sent from the predefined terminal through the second wireless power supply module in response to the predefined terminal being required to disconnect from the camera.

It should be noted that, in the present embodiment, the second disconnection request may carry the current connection state between the camera and the predefined terminal.

In an operation 103*g*, a second disconnection response is sent through the first wireless power supply module to the predefined terminal, and the wireless connection between the camera and the predefined terminal is interrupted based on the second disconnection response.

In the present embodiment, after the camera receives the second disconnection request, which is sent from the predefined terminal through the second wireless power supply module, through the first wireless power supply module, the camera may send the second disconnection response to the predefined terminal through the first wireless power supply module, and may be disconnected from the predefined terminal based on the second disconnection response.

It should be noted that, in the present embodiment, the camera may send the second disconnection response in response to the second disconnection request after receiving the second disconnection request sent from the predefined terminal, such that a following operation may be performed based on the second disconnection response.

Further, in the present embodiment, the second disconnection response may carry the disconnection instruction. In details, the disconnection instruction may be configured to instruct whether the connection is to be interrupted.

Further, in the present embodiment, the disconnection instruction may be allowing disconnection or refusing disconnection. The wireless connection between the camera and the predefined terminal may be interrupted in response to the disconnection instruction carried by the second disconnection response being allowing disconnection.

Further, in the present embodiment, the wireless connection between the camera and the predefined terminal may be interrupted after the camera sends the second disconnection response to the predefined terminal, such that the power consumption may be reduced effectively.

According to the present embodiment, a charging method is provided. The camera receives the turn-on instruction, and the lifting operation may be performed on the camera in response to the turn-on instruction. The wireless connection between the camera and the predefined terminal is established in response to the camera being lifted up and reaching the predefined position. The predefined terminal is arranged with the second wireless power supply module. The charging process may be performed on the camera by the predefined terminal through the first wireless power supply module and the second wireless power supply module. Therefore, in the present embodiment, the camera may be configured with the first wireless power supply module, and the predefined terminal may be configured with the second wireless power supply module. After the wireless connection is established through the first wireless power supply module and the second wireless power supply module, the charging process may be performed on the camera directly. As the camera is wirelessly connected to the predefined terminal, while the charging process is being performed, the camera may not be limited by the impedance control, and therefore, the feasibility of producing the camera is improved. Further, in the present embodiment, as the wireless connection between the camera and the predefined terminal is non-physical connection, the service time of the camera may not be reduced due to repetitively lifting up and lowering down the camera for turning on and turning off. Therefore, the quality of the camera may be improved effectively.

Embodiment IV

Based on the above Embodiment I, in the present embodiment, after the charging process is performed on the camera through the first wireless power supply module and the second wireless power supply module, and that is after the operation 103, the method for charging the camera further includes following operations.

In an operation 105, a turn-off instruction is received by the camera.

In the present embodiment, after the charging process is performed on the camera through the first wireless power supply module and the second wireless power supply module, the camera may receive the turn-off instruction.

It should be noted that, in the present embodiment, the camera may receive the turn-off instruction by various means. For example, the camera may receive the turn-off instruction based on a pressing operation performed by a user, or based on a pre-set triggering condition.

In an operation 106, a lowering-down operation is performed on the camera in response to the turn-off instruction.

In the present embodiment, after the camera receives the turn-off instruction, the lowering-down operation may be performed on the camera in response to the turn-off instruction.

It should be noted that, in the present embodiment, the lifting up operation may be performed on the camera based on the turn-on instruction, and the lowering-down operation may be performed on the camera based on the turn-off instruction. In details, in the present embodiment, the camera may be lifted up after receiving the turn-on instruction; and correspondingly, the camera may be lowered down after receiving the turn-off instruction.

Figure 9:
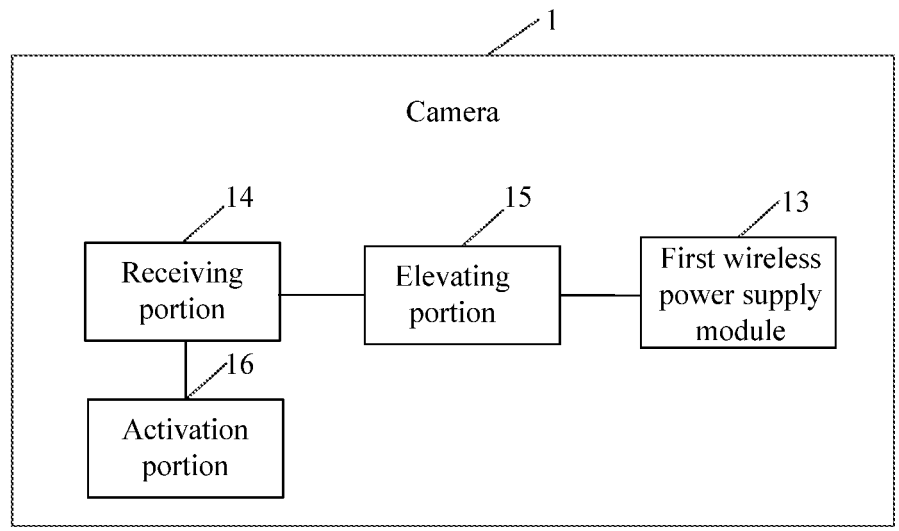
FIG. 9 is a second schematic view of a camera according to an embodiment of the present disclosure.

According to the present embodiment, a charging method is provided. The camera receives the turn-on instruction, and the lifting operation may be performed on the camera in response to the turn-on instruction. The wireless connection between the camera and the predefined terminal is established in response to the camera being lifted up and reaching the predefined position. The predefined terminal is arranged with the second wireless power supply module. The charging process may be performed on the camera by the predefined terminal through the first wireless power supply module and the second wireless power supply module. Therefore, in the present embodiment, the camera may be configured with the first wireless power supply module, and the predefined terminal may be configured with the second wireless power supply module. After the wireless connection is established through the first wireless power supply module and the second wireless power supply module, the charging process may be performed on the camera directly. As the camera is wirelessly connected to the predefined terminal, while the charging process is being performed, the camera may not be limited by the impedance control, and therefore, the feasibility of producing the camera is improved. Further, in the present embodiment, as the wireless connection between the camera and the predefined terminal is non-physical connection, the service time of the camera may not be reduced due to repetitively lifting up and lowering down the camera for being turned on and off. Therefore, the quality of the camera may be improved effectively Embodiment V Derived from a same inventive concept of Embodiment I to Embodiment IV, FIG. 9 shows a second schematic view of a camera according to an embodiment of the present disclosure. As shown in FIG. 9, a camera 1 is provided in the present embodiment and includes a receiving portion 14, an elevating portion 15, and an activation portion 16.

The receiving portion 14 is configured to receive the turn-on instruction.

The elevating portion 15 is configured to perform the lifting operation in response to the turn-on instruction, after the receiving portion 14 receiving the turn-on instruction.

The first wireless power supply module 13 is configured to: establish the wireless connection with the predefined terminal in response to the camera being lifted up to reach the predefined position, after the elevating portion 15 performing the lifting operation in response to the turn-on instruction; and to enable the charging process to be performed on the camera through the wireless connection. The predefined terminal is configured with the second wireless power supply module, and establishment of the wireless connection is achieved by the first wireless power supply module 13 interacting with the second wireless power supply module.

Further, in the present embodiment, the first wireless power supply module 13 is configured to send the charging request to the predefined terminal; to receive the charging response sent from the predefined terminal through the second wireless power supply module; and to enable the charging process to be performed on the camera based on the charging response.

Further, in the present embodiment, the wireless power supply module 13 is further configured to receive the power supply request which is sent from the predefined terminal through the second wireless power supply module; to send the power supply response to the predefined terminal; and to enable the charging process to be performed on the camera based on the power supply response.

In the present embodiment, the activation portion 16 is configured to activate the first wireless power supply module in response to the turn-on instruction, after the turn-on instruction being received and before the wireless connection between the camera and the predefined terminal being established.

Further, in the present embodiment, the first wireless power supply module 13 is further configured to send the first disconnection request to the predefined terminal after the charging process being performed based on the charging response; to receive the first disconnection response which is sent from the predefined terminal through the second wireless power supply module; and to enable the wireless connection between the camera and the predefined terminal to be interrupted based on the first disconnection response.

Further, in the present embodiment, the first wireless power supply module 13 is further configured to receive the second disconnection request which is sent from the predefined terminal through the second wireless power supply module; to send the second disconnection response to the predefined terminal; and to enable the wireless connection between the camera and the predefined terminal to be interrupted based on the second disconnection response.

Further, in the present embodiment, the receiving portion 14 is further configured to receive the turn-off instruction through the first wireless power supply module and the second wireless power supply module after the charging process being performed.

The elevating portion 15 is further configured to perform the lowering-down operation in response to the turn-off instruction after the receiving portion 14 receiving the turn-off instruction.

Figure 10:
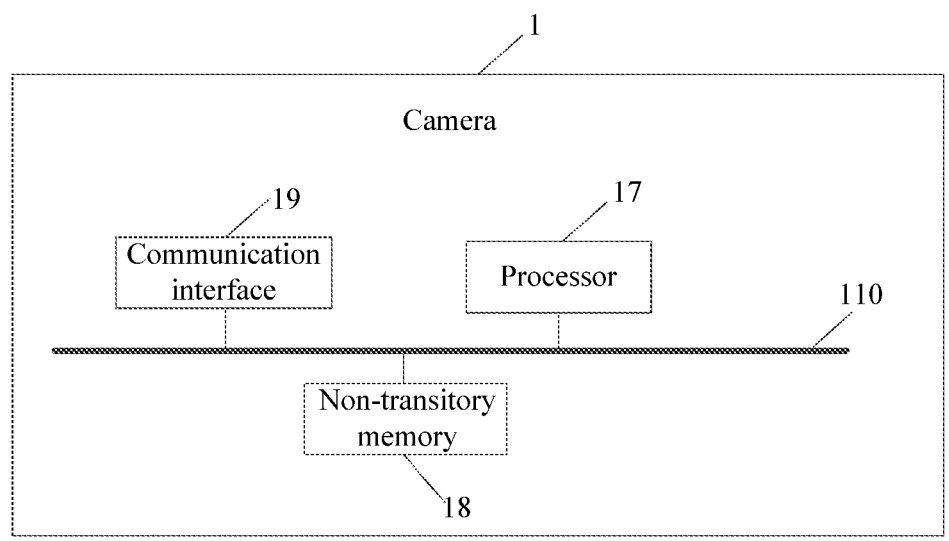
FIG. 10 is a third schematic view of a camera according to an embodiment of the present disclosure.

FIG. 10 is a third schematic view of a camera according to an embodiment of the present disclosure. As shown in FIG. 10, the camera 1 further includes a processor 17, a non-transitory storage 18 which stores an instruction able to be executed by the processor 17, a communication interface 19, and a bus line 110 configured to connect to the processor 17, the non-transitory storage 18 and the communication interface 19.

In the present embodiment, the processor 17 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a micro-controller, and a micro-processor. It should be understood that, for various devices, other electronic elements may be configured to implement the above-mentioned processor functions, and may not be limited by the present disclosure. The camera 1 may further include the non-transitory storage 18, and the non-transitory storage 18 may be connected to the processor 17. The non-transitory storage 18 may be configured to store an executable program code, and the executable program code may include a computer operation instruction. The non-transitory storage 18 may include a cache and a non-volatile memory, such as at least two magnetic disk storages.

In the present embodiment, the bus line 110 is configured to connect to the communication interface 19, the processor 17, and the non-transitory storage 18, and enables the communication between the communication interface 19, the processor 17, and the non-transitory storage 18.

In the present embodiment, the non-transitory storage 18 is configured to store instructions and data.

Further, in the present embodiment, the processor 17 is configured to receive the turn-on instruction and perform the lifting operation in response to the turn-on instruction; to establish the wireless connection with the predefined terminal when the camera is lifted to reach the predefined position; and to enable the charging process to be performed through the first wireless power supply module and the second wireless power supply module. The predefined terminal is configured with the second wireless power supply module.

Practically, the non-transitory storage 18 may be a volatile memory, such as a random-access memory (RAM). Alternatively, the non-transitory storage 18 may be a non-volatile memory, such as a read-only memory (ROM), a flash memory, a hard disk drive (HDD), or a solid-state drive (SSD). Alternatively, the non-transitory storage 18 may be a combination of the above-mentioned memories, and may provide the instructions and data for the processor 17.

In addition, in the present embodiment, various functional modules may be integrated into one processing unit. Alternatively, various units may be physically arranged and independent from each other. Alternatively, two or more units may be integrated into one unit. The integrated unit may be achieved in a hardware form or in a form of software modules.

When the integrated unit is achieved in the form of software modules and is not sold or used as an independent product, the integrated unit may be stored in a computer-readable non-transitory storage medium. In this way, an essence of the present disclosure, a portion of the present disclosure that is contributive to the related art, or the entirety of the present disclosure may be achieved as a software product. The computer software product may be stored in a non-transitory storage medium and may include a plurality of instructions enabling a computing device (may be a personal computer, a server, or a network device) or a processor to execute all of or some of the operations of the method described in the above embodiments. The above-mentioned storage medium may be any medium able to store program codes, including: a universal serial bus (USB), a portable hard disk, a ROM, a RAM, a magnetic disk, an optical disk, and so on.

In the present embodiment, a camera is provided. The camera receives the turn-on instruction, and the lifting operation may be performed in response to the turn-on instruction. When the camera is lifted up and reaches the predefined position, the wireless connection between the camera and the predefined terminal is established. The predefined terminal is arranged with the second wireless power supply module. The charging process may be performed between the camera and the predefined terminal through the first wireless power supply module and the second wireless power supply module. Therefore, in the present embodiment, the camera and the predefined terminal may be configured with the first wireless power supply module and the second wireless power supply module, respectively. After the wireless connection is established through the first wireless power supply module and the second wireless power supply module, the charging process may be performed on the camera directly. As the camera is wirelessly connected to the predefined terminal, while the charging process is being performed, the camera may not be limited by the impedance control, and therefore, the feasibility of producing the camera is improved. Further, in the present embodiment, as the wireless connection between the camera and the predefined terminal is non-physical connection, the service time of the camera may not be reduced due to repetitively lifting up and lowering down the camera for being turned on and off. Therefore, the quality of the camera may be improved effectively.

In the present embodiment, a first computer-readable non-transitory storage medium is provided and is configured to store a program. The program may be executed by the processor to implement the methods described in the Embodiment I to Embodiment IV.

In details, a program instruction corresponding to the charging method may be stored in a non-transitory medium, such as the optical disk, the hard drive, the USB, and so on. When program instruction corresponding to the charging method is read or executed by an electronic device, following operations may be performed.

The turn-on instruction is received, and the lifting operation is performed in response to the turn-on instruction.

When the camera is lifted to reach the predefined position, the wireless connection between the camera and the predefined terminal is established. The predefined terminal is configured with the second wireless power supply module.

The charging process is performed through the first wireless power supply module and the second wireless power supply module.

Any ordinary skilled person in the art should understand that the embodiments of the present disclosure provide a method, a system, or a computer program product. Therefore, the present disclosure may be achieved as an embodiment of hardware, an embodiment of software, or an embodiment of combination of the hardware and the software. Further, the present disclosure may be achieved as a computer program product which is implemented on a computer non-transitory storage medium (which includes but is not limited to the magnetic memory, the optical memory, and so on) having a computer program code.

The present disclosure is illustrated based on the methods provided in the embodiments, the device (system) provided in the embodiments, and the flow charts and/or block diagrams for implementing the methods provided in the embodiments. It should be understood that the computer program instruction is configured to achieve each process and/or block shown in the flow chart and/or the block diagram, and to achieve combination of the process and/or the block shown in the flow chart and/or the block diagram. The computer program instruction may be provided for a general-purpose computer, a special-purpose computer, an embedded processor or processors of other programmable data processing devices, to produce a machine, such that the instruction, which is executed by the processors of the computer or other programmable data processing devices, may generate an apparatus, which is configured to implement functions indicated by one or more processes shown in the flow chart and/or functions indicated by one or more blocks shown in the block diagrams.

The computer program instruction may be stored in a computer-readable non-transitory memory to induce the computer or the other programmable data processing devices to work in a particular manner, such that the instruction stored in the computer-readable non-transitory memory may generate a product that includes an instruction apparatus, and the instruction apparatus is configured to implement functions indicated by one or more processes shown in the flow chart and/or functions indicated by one or more blocks shown in the block diagrams.

Alternatively, the computer program instructions may be loaded to the computer or the other programmable data processing devices, such that the computer or the other programmable data processing devices may execute a series of operations to achieve operations. In this way, the instruction, which is executed by the computer or the other programmable data processing devices, may provide operations to achieve the functions indicated by one or more processes shown in the flow chart and/or functions indicated by one or more blocks shown in the block diagrams.

The above description shows preferred embodiments of the present disclosure only, and does not limit the scope of the present disclosure. According to the embodiments of the present disclosure, a charging method is provided. The camera receives the turn-on instruction, and the lifting operation may be performed on the camera in response to the turn-on instruction. The wireless connection between the camera and the predefined terminal is established in response to the camera being lifted up and reaching the predefined position. The predefined terminal is arranged with the second wireless power supply module. The charging process may be performed on the camera by the predefined terminal through the first wireless power supply module and the second wireless power supply module. Therefore, in the present embodiment, the camera may be configured with the first wireless power supply module, and the predefined terminal may be configured with the second wireless power supply module. After the wireless connection is established through the first wireless power supply module and the second wireless power supply module, the charging process may be performed on the camera directly. As the camera is wirelessly connected to the predefined terminal, while the charging process is being performed, the camera may not be limited by the impedance control, and therefore, the feasibility of producing the camera is improved. Further, in the present embodiment, as the wireless connection between the camera and the predefined terminal is non-physical connection, the service time of the camera may not be reduced due to repetitively lifting up and lowering down the camera for being turned on and off. Therefore, the quality of the camera may be improved effectively.

What is claimed is:

1. A charging method, applied in a camera configured with a first wireless power supply module, the method comprising:
   receiving a turn-on instruction, performing a lifting operation in response to the turn-on instruction;
   establishing wireless connection between the camera and a predefined terminal, wherein the predefined terminal is configured with a second wireless power supply module; and
   performing a charging process through the first wireless power supply module and the second wireless power supply module.

2. The charging method as claimed in claim 1, wherein the performing the charging process through the first wireless power supply module and the second wireless power supply module comprises:
   sending a charging request to the predefined terminal through the first wireless power supply module;
   receiving a charging response which is sent from the predefined terminal through the second wireless power supply module; and
   performing the charging process based on the charging response.

3. The charging method as claimed in claim 1, wherein the performing the charging process through the first wireless power supply module and the second wireless power supply module comprises:
   receiving a power supply request which is sent from the predefined terminal through the second wireless power supply module; and
   sending a power supply response to the predefined terminal through the first wireless power supply module, and performing the charging process based on the power supply response.

4. The charging method as claimed in claim 1, further comprising:
   after the receiving the turn-on instruction, activating the first wireless power supply module in response to the turn-on instruction.

5. The charging method as claimed in claim 2, further comprising:
   after the performing the charging process based on the charging response:
   sending a first disconnection request to the predefined terminal through the first wireless power supply module;
   receiving a first disconnection response which is sent from the predefined terminal through the second wireless power supply module; and
   interrupting the wireless connection between the camera and the predefined terminal based on the first disconnection response.

6. The charging method as claimed in claim 3, further comprising:
   after the performing the charging process based on the charging response:
   receiving a second disconnection request which is sent from the predefined terminal through the second wireless power supply module; and
   sending a second disconnection response to the predefined terminal through the first wireless power supply module, and interrupting the wireless connection between the camera and the predefined terminal based on the second disconnection response.

7. The charging method as claimed in claim 1, further comprising:
   after the performing the charging process through the first wireless power supply module and the second wireless power supply module:
   receiving a turn-off instruction; and
   performing a lowering-down operation in response to the turn-off instruction.

8. An electronic terminal, comprising a terminal body and a camera, wherein
   the camera comprises a shell slidably connected to the terminal body, a camera module, and a first power supply module;
   the camera module and the first power supply module are arranged inside the shell, and are configured to be synchronously slided relative to the terminal body when the shell is slided relative to the terminal body;
   the terminal body is arranged with a second power supply module;
   the first power supply module is configured to wirelessly connect to the second power supply module in response to the first power supply module being slided to reach a predefined position relative to the second power supply module; and
   the camera is configured to receive a charging process through the first power supply module and the second power supply module.

9. The camera as claimed in claim 8, wherein the predefined position is a relative position at which an area of an overlapping region between the first wireless power supply module and the second wireless power supply module is greater than a threshold and satisfies a requirement for the charging process to be performed.

10. The camera as claimed in claim 8, wherein
    the terminal body further comprises a middle frame;
    the middle frame comprises: two side faces opposite to each other, a top face arranged between and connected to the two side faces, and a bottom face arranged between and connected to the two side faces; and
    the top face is recessed inwardly towards the bottom face to define a receiving chamber.

11. The camera as claimed in claim 10, wherein the shell is slidably connected to the middle frame of the terminal body.

12. The camera as claimed in claim 11, wherein the shell is capable of being slided to be received in the receiving chamber of the terminal body, enabling the first power supply module and the second power supply module to be disconnected from each other.

13. The camera as claimed in claim 11, wherein the shell is capable of being slided to be extended out of the receiving chamber of the terminal body, enabling the first power supply module to be slided to reach the predefined position relative to the second power supply module.

14. A camera, comprising a processor, a non-transitory memory which stores an instruction able to be executed by the processor, a communication interface, and a bus line configured to connect to the processor, the non-transitory memory, and the communication interface, wherein the processor is configured to execute the instruction to perform operations of:
   receiving, by the camera, a turn-on instruction, performing a lifting operation on the camera in response to the turn-on instruction;

establishing wireless connection between the camera and a predefined terminal, wherein the predefined terminal is configured with a second wireless power supply module; and performing a charging process on the camera through the first wireless power supply module and the second wireless power supply module.

15. The camera as claimed in claim 14, wherein when performing a charging process on the camera through the first wireless power supply module and the second wireless power supply module, the processor is further configured to execute the instruction to perform operations of:

sending a charging request to the predefined terminal through the first wireless power supply module from the camera;

receiving, by the camera, a charging response which is sent from the predefined terminal through the second wireless power supply module; and performing the charging process on the camera based on the charging response.

16. The camera as claimed in claim 14, wherein when performing the charging process on the camera through the first wireless power supply module and the second wireless power supply module, the processor is further configured to execute the instruction to perform operations of:

receiving, by the camera, a power supply request which is sent from the predefined terminal through the second wireless power supply module; and sending a power supply response to the predefined terminal through the first wireless power supply module from the camera, and performing the charging process on the camera based on the power supply response.

17. The camera as claimed in claim 14, wherein the processor is further configured to execute the instruction to perform operations of:

after the receiving, by the camera, the turn-on instruction, activating the first wireless power supply module in response to the turn-on instruction.

18. The camera as claimed in claim 15, wherein the processor is further configured to execute the instruction to perform operations of:

after the performing the charging process on the camera based on the charging response:

sending a first disconnection request to the predefined terminal through the first wireless power supply module from the camera;

receiving, by the camera, a first disconnection response which is sent from the predefined terminal through the second wireless power supply module; and interrupting the wireless connection between the camera and the predefined terminal based on the first disconnection response.

19. The camera as claimed in claim 16, wherein the processor is further configured to execute the instruction to perform operations of:

after the performing the charging process on the camera based on the charging response:

receiving, by the camera, a second disconnection request which is sent from the predefined terminal through the second wireless power supply module; and sending a second disconnection response to the predefined terminal through the first wireless power supply module from the camera, and interrupting the wireless connection between the camera and the predefined terminal based on the second disconnection response.

20. The camera as claimed in claim 14, wherein the processor is further configured to execute the instruction to perform operations of:

after the performing a charging process through the first wireless power supply module and the second wireless power supply module:

receiving a turn-off instruction; and performing a lowering-down operation in response to the turn-off instruction.

* * * * *